United States Patent Office 3,595,957
Patented July 27, 1971

3,595,957
ANTICARIOGENIC COMPOSITIONS AND METHODS
Joseph C. Muhler, Indianapolis, Ind., assignor to Indiana University Foundation, Bloomington, Ind.
No Drawing. Continuation of application Ser. No. 621,155, Mar. 7, 1967. This application Apr. 28, 1970, Ser. No. 29,774
Int. Cl. A61k 7/16, 27/00
U.S. Cl. 424—199
8 Claims

ABSTRACT OF THE DISCLOSURE

By reacting urea and phosphorus pentoxide in an aqueous environment a new class of compounds may be obtained. These compounds exhibit a high degree of anticariogenic effectiveness, especially in the presence of sugar or when employed in comestibles or sugar-containing comestibles. Among these new compounds are dimerized urea carbamido' pyrophosphate, tetraurea pyrophosphate, and urea pyrophosphate.

CROSS REFERENCE

This application is a continuation of applicant's United States patent application Ser. No. 621,155, filed Mar. 7, 1967, now abandoned.

BACKGROUND OF THE INVENTION

Field of the invention

The present invention relates to the dental arts and in particular to new compositions of matter which find utility as anticariogenic agents. Specifically, the invention relates to the utilization of these compounds in comestibles, sugar containing comestibles, or in a sugar environment. The invention further relates to the manufacture of food products and sugar-containing food products incorporating such new compositions in order to reduce the cariogenic potential of the food products.

Description of the prior art

The prior art has long sought a means to compensate for the cariogenic potential of sugars and foods containing sugars. It has been theorized that when sugars are placed in the mouth they give rise to the production of acids which promote dental caries. With respect to children in particular, contributing causes of dental caries may be the adherence of sugars and their decomposition products to the dental plaque after ingestion, the slow rate of oral clearance, the accumulation of weak organic acids within the dental plaque, or combinations of such factors.

A number of anticariogenic agents (e.g., fluoride-containing salts) have been evaluated in the past in systems wherein the anticariogenic agent is applied or comsumed topically (i.e., directly on the teeth) in the form of a dentifrice (e.g., a toothpaste or toothpowder), a prophylactic paste composition, or a topical solution. It would be highly desirable to incorporate one of the known anticariogenic agents in a saccharide in order to inhibit any tendency of the saccharide to increase the incidence of dental caries. However, knowledge gained of the anticariogenic efficacy of agents used in topical applications has not permitted prediction of efficacy for these anticaries agents in other applications, such as in foods embodying a carbohydrate such as sucrose. Thus, known anticariogenic agents have in general not exhibited any substantial degree of anticariogenic efficacy when used in sugars. For example, known anticariogenic agents such as fluoride-containing salts, Vitamin K, nitrofurans, ammonium compounds, iodo-acetic acid, and the like, when added to sugar or to a foodstuff containing a high percentage of sugar, have little direct topical effect and rapidly lose their anticariogenic effectiveness after ingestion.

Oxalic acid, ($-CO_2H$)$_2$, has exhibited a degree of effectiveness in reducing the cariogenic potential of sugar and sugar-containing compositions, as set forth and described in applicant's co-pending United States patent application entitled Anticariogenic Comestibles and Processes for Producing Same, Ser. No. 602,566, filed Dec. 19, 1966, now abandoned. However, in order to obtain a significant reduction in the cariogenic potential of sugar and sugar-containing compositions, it is necessary to provide oxalic acid at relatively high concentration levels. It would, therefore, be desirable to provide anticariogenic agents that would be effective at significantly lower concentration levels.

Mono-sodium dihydrogen phosphate, $NaH_2PO_4$, has been shown to be an effective anticariogenic agent when utilized in sugar-containing comestibles, especially sugar-coated breakfast cereal products, as set forth and described in applicant's co-pending United States patent application entitled Anticariogenic Food Product and Process for Producing Same, Ser. No. 519,004, filed Jan. 6, 1966, now abandoned. However, as in the case of oxalic acid, $NaH_2PO_4$ must be used at relatively high concentration levels. $NaH_2PO_4$ must be provided at an even higher level of concentration in an aqueous sucrose solution in order to exhibit the same degree of effectiveness shown in a solid comestible product. In addition, $NaH_2PO_4$, because of the presence of the alkali metal sodium ion, is not completely satisfactory from an organoleptic standpoint. $NaH_2PO_4$ is quite effective as a buffering agent and thus alters the pH of a food product into which it is incorporated, thereby creating potential taste problems of practical significance. It would, therefore, be desirable to provide anticariogenic agents that would be effective, yet which would exhibit none of the relative disadvantages of $NaH_2PO_4$.

SUMMARY OF THE INVENTION

In accordance with the present invention, it has been discovered that a new class of anticariogenic compounds may be obtained by reacting urea with phosphorus pentoxide in an aqueous environment. It has been found that the new class of compounds exhibits a high degree of anticariogenic effectiveness in the presence of sugar or when employed in comestibles or in sugar-containing comestibles. In particular, it has been found that when urea and phosphorus pentoxide ($P_4O_{10}$) are reacted in an aqueous environment in molar ratios of 2:1, 4:1, and 8:1 products are obtained that exhibit the described high level of anticariogenic effectiveness.

A primary object of the present invention is to provide new compositions of matter that exhibit a high degree of effectiveness in reducing the cariogenic potential of comestibles, especially sugar and sugar-containing comestibles at relatively low concentration levels.

A further object of the present invention is to provide new compositions of matter of the character described which produce no adverse organoleptic effects when employed in sugar or sugar-containing compositions.

A further object is to provide new compositions of matter of the character described that exhibit anticariogenic effectiveness of greater magnitude when provided in close proximity to sugars.

Yet another object of the present invention is to provide new compositions of matter of the character described which exhibit anticariogenic effectiveness in both aqueous solution form and in solid comestible form.

These and other objects, advantages, and features of the present invention will hereinafter appear, and for purposes of illustration, but not of limitation, exemplary embodiments of the present invention are hereinafter described.

DETAILED DESCRIPTION OF THE PREFERRED EMBODIMENTS

As noted above, it has been discovered that a new class of anticariogenic compounds may be obtained by reacting urea with phosphorus pentoxide in an aqueous environment. It has been found that the new class of compounds exhibits a high degree of anticariogenic effectiveness in the presence of sugar or when employed in comestibles or in sugar-containing comestibles. In particular, it has been found that when urea and phosphorus pentoxide ($P_4O_{10}$) are reacted in an aqueous environment in molar ratios of 2:1, 4:1, and 8:1 products are obtained that exhibit the described high level of anticariogenic effectiveness. Throughout this application, molar ratios are stated in terms of moles urea to moles phosphorus pentoxide, expressed as $P_4O_{10}$.

Reaction of urea and phosphorus pentoxide in a 2:1 molar ratio

The reaction of urea and phosphorus pentoxide ($P_4O_{10}$) in a molar ratio of 2:1 in an aqueous environment produces, as a reaction product, a chalky-white, viscous, syrup-like material. The reaction product comprises, as its major constituent, urea pyrophosphate, a compound having the structure:

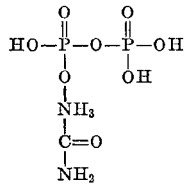

In addition, as a minor constituent, the reaction product comprises carbamido pyrophosphate, a compound having the structure:

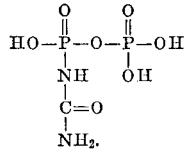

Urea pyrophosphate (which is a hydrated form of carbamido pyrophosphate) is believed to be the major constituent of the mixture because the reaction occurs in the presence of an excess of water, and, in addition, because of the water of hydration analyzed in the product mixture. This conclusion is further supported by molecular weight determinations.

A procedure by which the mixture comprising a major portion of urea pyrophosphate and a minor portion of carbamido pyrophosphate may be obtained is given in the following example.

EXAMPLE I 30.0 grams (0.5 moles) of chemical grade urea are dissolved with stirring in 30 milliliters of redistilled water in a constant temperature bath maintained at 50–60° C. 71.0 grams (0.25 mole) of phosphorus pentoxide ($P_4O_{10}$) are then added slowly with constant stirring during a 5 minute period, with the temperature being maintained at 50–60° C. The stirirng is continued until the reaction mixture becomes quite viscous. Stirring is then discontinued and the product is maintained at 50° C. for 48 hours, at which time it is collected and dried over calcium chloride for a period of about 96 hours. The final product is obtained in a yield of about 98–100%.

The product mixture (comprising, as a major constituent, urea pyrophosphate) obtained through the reaction of urea with phosphorus pentoxide ($P_4O_{10}$) in a molar ratio of 2:1 in the presence of an excess of water exhibits anticariogenic effectiveness when employed in comestibles or in a sugar environment, as hereinafter described in detail.

Reaction of urea of phosphorus pentoxide in a 4:1 molar ratio

The reaction of urea and phosphorus pentoxide ($P_4O_{10}$) in a molar ratio of 4:1 in an aqueous environment produces a chalky-white, odorless, tasteless, crystalline, slightly hygroscopic solid melting at 113±3° C. 22.7 grams of this product are soluble per 100 milliliters redistilled water at 27° C. The reaction product comprises, as its major constituent, dimerized urea carbamido' pyrophosphate, a compound having the structure:

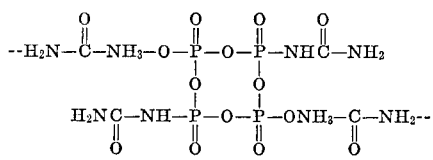

In addition, the reaction product mixture further comprises, as minor constituents, the following intermediates:
urea carbamido' pyrophosphate,

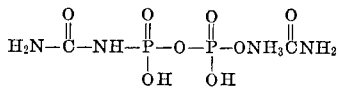

diurea pyrophosphate,

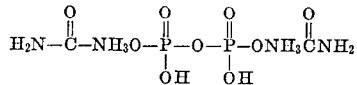

dimerized diurea pyrophosphate,

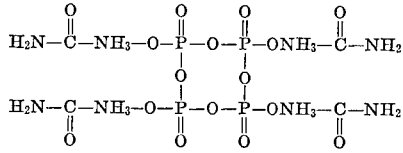

urea orthophosphate,

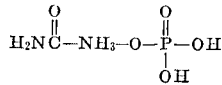

carbamido phosphoric acid,

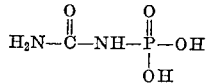

Dimerized urea carbamido' pyrophosphate is believed to be the major constituent of the mixture because the reaction occurs in the presence of an excess of water and, further, because of the water of hydration analyzed in the product mixture. This conclusion is further supported by molecular weight determinations. The procedure by which the product mixture may be obtained is given in the following example.

EXAMPLE II 120.0 grams (2 moles) chemical grade urea are dissolved with stirring in 120 milliliters redistilled water in a constant temperature bath maintained at 50–60° C. After solution is completed, 142.0 grams (0.5 mole) of reagent grade phosphorus pentoxide ($P_4O_{10}$) are added during a 15 minute period with continued stirring and maintenance of a temperature of 50–60° C. A heavy white precipitate is formed within about 15 (±10) minutes and thereafter stirring is discontinued, but the reaction mixture is maintained at 50° C. for about 24 hours. The product is then collected and dried in a vacuum desiccator over concentrated sulfuric acid or calcium chloride with a slight vacuum of 200 mm. Hg. The final product is obtained in a 97 to 99% yield.

A typical assay for a product produced in accordance with the foregoing example would conform to the values given in the following table.

TABLE I

Chemical composition

| Element: | Typical assay, percent |
|---|---|
| Carbon | 7.53 |
| Hydrogen | 4.61 |
| Nitrogen | 16.11 |
| Phosphorus | 24.00 |
| Oxygen | 47.65 |
| | 99.90 |

Water of hydration: 13.31%

The product of the reaction of urea with phosphorus pentoxide ($P_4O_{10}$) in a molar ratio of 4:1 in the presence of an excess of water comprising a major amount of urea carbamido' pyrophosphate and minor amounts of intermediate compounds urea carbamido' pyrophosphate, diurea pyrophosphate, dimerized diurea pyrophosphate, urea orthophosphate, and carbamido' phosphoric acid exhibits anticariogenic effectiveness when employed in comestibles or in a sugar environment, as hereinafter described.

Reaction of urea and phosphorus pentoxide in an 8:1 molar ratio

The reaction of urea and phosphorus pentoxide ($P_4O_{10}$) in a molar ratio of 8:1 in an aqueous environment produces, as a reaction product, a chalky-white, odorless, tasteless, hygroscopic solid that melts at 92.5±3° C. 23.8 grams of the product are soluble per 100 milliliters redistilled water at 27° C. The reaction product is believed to comprise, as a major constituent, tetraurea pyrophosphate, a compound having the structure:

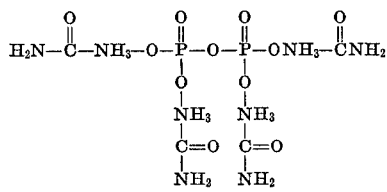

In addition, as minor constituents, the product mixture comprises the following intermediate compounds:

diurea dicarbamido pyrophosphate,

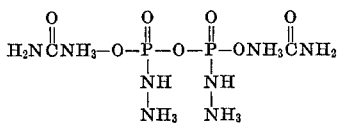

diurea orthophosphate,

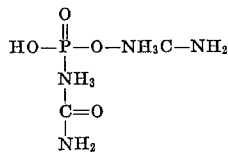

urea carbamido phosphate,

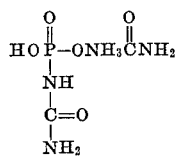

Tetraurea pyrophosphate is believed to be the major constituent of the mixture because the reaction occurs in the presence of an excess of water and, in addition, because of the water of hydration present in the product mixture. This conclusion is further supported by molecular weight determinations.

The procedure by which the product mixture comprising a major portion of tetraurea pyrophosphate may be obtained is given in the following example.

EXAMPLE III 240 grams (4 moles) of chemical grade urea are dissolved with stirring in 240 milliliters of redistilled water in a constant temperature bath maintained at 50–60° C. After solution is completed, 142.0 grams (0.5 mole) of reagent grade phosphorus pentoxide ($P_4O_{10}$) are added over a 4 minute period with continued stirring and maintenance of a temperature of 50–60° C. The phosphorus pentoxide is added to the aqueous urea solution slowly enough to ensure complete reaction yet quickly enough to prevent premature solidification of reaction mixture resulting in a higher content of various intermediate forms of the product. The reaction exotherm is not allowed to exceed 75° C. at any time during the addition of the phosphorus pentoxide. Thereafter, the mixture is stirred for 24 to 36 hours while the constant temperature of 50° C. is maintained. At the termination of stirring, the viscous mixture is dried in a vacuum desiccator over concentrated sulfuric acid or calcium chloride with a slight vacuum of 200 mm. Hg. The final product is obtained in a 95 to 98% yield.

A typical assay for a product produced in accordance with the foregoing procedure would conform to the values given in Table II.

TABLE II

Chemical composition

| Element: | Typical assay, percent |
|---|---|
| Carbon | 11.00 |
| Hydrogen | 5.27 |
| Nitrogen | 25.89 |
| Phosphorus | 15.27 |
| Oxygen | 42.97 |
| | 100.00 |

Water of hydration: 18.02%

The product of the reaction of urea with phosphorus pentoxide in a molar ratio of 8:1 in the presence of an excess of water (comprising tetraurea pyrophosphate as the major constituent) exhibits anticariogenic effectiveness when employed in a sugar environment or in comestibles as hereinafter described in detail.

All of the above-described compounds are believed to be new except for urea orthophosphate,

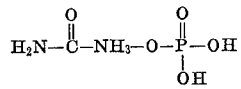

and all are believed to exhibit anticariogenic effectiveness in comestibles or in a sugar environment.

For convenience, the reaction products of the present invention will be referred to hereinafter in accordance with the following shorthand notation. The product of the reaction of urea and phosphorus pentoxide ($P_4O_{10}$) in a 2:1 molar ratio (i.e., a mixture comprising urea pyrophosphate as a major constituent and carbamido pyrophosphate as a minor constituent) is referred to as Compound 64. The product of the reaction of urea and phosphorus pentoxide ($P_4O_{10}$) in a 4:1 molar ratio (i.e., a mixture comprising dimerized urea carbamido' pyrophosphate as a major constituent and urea carbamide' pyrophosphate, carbamido phosphoric acid, diurea pyrophosphate, dimerized diurea pyrophosphate, and urea orthophosphate as minor constituents) is referred to as Compound 65. The product of the reaction of urea and phosphorus pentoxide ($P_4O_{10}$) in a molar ratio of 8:1

(i.e., a mixture comprising tetraurea pyrophosphate as a major constituent and diurea dicarbamido pyrophosphate, diurea orthophosphate, and urea carbamido phosphate at minor constituents) is referred to as Compound 66.

a sugar reduces and in some instances actually eliminates the cariogenic potential of the resulting mixture. It has been found that the cariogenic potential of comestibles and comestibles containing sugar is likewise reduced by incorporating therein a small amount of Compounds 64,

TABLE III.—X-RAY DIFFRACTION PATTERNS

| Compound 65 | | Compound 66 | | Victamide | |
|---|---|---|---|---|---|
| Interplanar spacing, A. (d) | Relative intensity (I) | Interplanar spacing, A. (d) | Relative intensity (I) | Interplanar spacing, A. (d) | Relative intensity (I) |
| 8.93 | 18 | 8.67 | 25 | 5.60 | 16 |
| 8.04 | 5 | 6.55 | 7 | 5.37 | 90 |
| 6.65 | 9 | 5.64 | 47 | 5.09 | 40 |
| 5.68 | 27 | 4.43 | 100 | 5.01 | 32 |
| 5.43 | 23 | 4.35 | 65 | 4.15 | 37 |
| 4.98 | 4 | 3.97 | 100 | 4.04 | 7 |
| 4.82 | 14 | 3.80 | 40 | 3.77 | 82 |
| 4.48 | 80 | 3.72 | 30 | 3.39 | 11 |
| 4.33 | 100 | 3.59 | 30 | 3.23 | 12 |
| 4.19 | 9 | 3.49 | 25 | 3.21 | 14 |
| 4.00 | 61 | 3.22 | 27 | 3.14 | 7 |
| 3.78 | 65 | 3.17 | 46 | 3.08 | 100 |
| 3.74 | 74 | 3.02 | 30 | 2.81 | 6 |
| 3.52 | 38 | 2.51 | 25 | 2.66 | 35 |
| 3.22 | 38 | 1.66 | 90 | 2.55 | 7 |
| 3.15 | 55 | | | 2.44 | 5 |
| 3.02 | 5 | | | 2.38 | 20 |
| 2.98 | 15 | | | 2.31 | 37 |
| 2.90 | 4 | | | 2.01 | 95 |
| 2.86 | 9 | | | 1.78 | 20 |
| 2.13 | 45 | | | 1.70 | 6 |
| 2.66 | 14 | | | 1.60 | 33 |
| 2.60 | 9 | | | | |
| 2.52 | 8 | | | | |
| 2.32 | 10 | | | | |
| 2.25 | 62 | | | | |
| 2.20 | 19 | | | | |
| 2.18 | 33 | | | | |
| 2.10 | 15 | | | | |
| 2.02 | 5 | | | | |
| 1.89 | 8 | | | | |
| 1.83 | 8 | | | | |
| 1.74 | 5 | | | | |

Compounds 65 and 66 have each been characterized according to the conventional Hull-Debye-Scherrer X-ray diffraction powder technique in order to produce a film record. Exposure was made using a standard X-ray diffraction camera (diameter 114.6 milliliters) for 4.0 hours at 35 kv. and 18 ma. with a copper target and a nickel filter. As is well known to one skilled in the art, this technique causes each chemical compound to emit electrons according to a pattern specific for each compound. The electrons expose a film according to a specific pattern, which appears on the film as characteristic lines, the interplanar spacing of which and the relative intensity of which may be measured in order to identify the compound. Table III records measurements obtained from a film record when each of Compounds 65 and 66 were treated as described, and for comparative purposes corresponding values obtained with "Victamide"[1] have also been included. The values under "d" are the interplanar distances expressed in Angstroms, and the values given under "I" represent the relative intensities of the lines obtained by arbitrarily assigning a value of 100 to the most intense line. The data presented in Table III show that the X-ray diffraction patterns for Compounds 65 and 66 disclosed herein are distinctive and are readily distinguishable from the pattern for "Victamide" and from the patterns of each other.

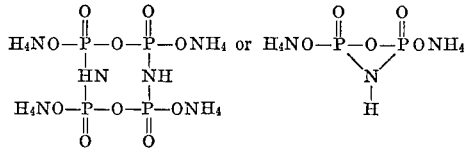

Anticariogenic effectiveness

It has been found that the incorporation of at least a small amount of Compounds 64, 66, and/or 66 with

[1] An ammonium salt of a condensation product of $NH_3$ and $P_4O_{10}$ commercially available from the Victor Chemical Company under the trademark "Victamide," e.g., 65, and/or 66. In fact, it has been found that the incorporation of a small amount of one of Compounds 64, 65, and/or 66 in a sugar-containing comestible reduces the cariogenic potential thereof below that for the comestible alone, without sugar.

Compounds 64, 65, and/or 66 may be incorporated in the comestible in substantially any manner (e.g., by physical mixing in the solid state) or by addition to an aqueous sugar solution (e.g., during the refining process). In addition, where it is to be used in a sugar-containing comestible, Compounds 64, 65, and/or 66 may first be mixed with the sugar and the treated sugar thereafter added to the comestible, or Compounds 64, 65, and/or 66 may be directly added to the sugar-containing comestible (i.e., either before or after the sugar addition or simultaneously therewith). Of course, the manner of adding Compounds 64, 65, and/or 66 is not controlling so long as the resulting food product embodies Compounds 64, 65, and/or 66 at the operative level hereinafter specified.

The term "sugar" as used herein should be understood to mean sugars (i.e., any saccharide or combination of saccharides regardless of source, such as from cane, beet, or corn, or of condition, such as raw or refined, liquid, or dry, and includes among others dextrose, glucose, lactose, fructose, sucrose, corn syrup, corn syrup solids, and invert syrups) as well as various starches (e.g., corn starch and potato starch). Sucrose is a preferred sugar by virtue of its widespread industrial and consumer use.

As used herein the term "comestible" should be understood to mean substantially any of the wide range of ingestible materials, e.g., bakery products, cereals, candies, chewing gum, prepared beverages, fruit preparations, and the like.

In accordance with the present invention, the cariogenic potential of sugars may be reduced by incorporating therewith at least about 0.05% Compound 64, Compound 65, or Compound 66 by weight of the sugar. Each of these compounds is effective and operable at the same concentration levels. However, Compounds 65 and 66 are preferred species by virtue of their higher levels of anticariogenic effectiveness.

When the term "anticariogenic agent" is used hereinafter, it should be understood to refer to and encompass each of Compounds 64, 65, and 66, unless another meaning is clearly indicated.

While the anticariogenic agents of the present invention are effective in the broad class of carbohydrates including starches, they are particularly effective in sucrose, and the combination of the anticariogenic agents with sucrose is a preferred embodiment of the present invention.

Where the sugar and anticariogenic agent are incorporated in a comestible, the same relative proportions are utilized, i.e., at least about 0.05% anticariogenic agent by weight of the comestible.

Anticariogenic agents may be added to the sugar or to a comestible or a sugar-containing comestible at substantially any level above the specified minimum effective level. Where employed in an amount greater than about 15% by weight, further reduction in the cariogenic potential of the composition is not experienced. Thus, about 15% by weight is a convenient maximum level for the anticariogenic agent. The preferred anticariogenic agent range is about 0.25–2.0 by weight of the over-all composition. However, considerations other than anticariogenicity (e.g., cost, etc.) may, as a practical matter, reduce the maximum anticariogenic agent level to about 1.5% by weight.

The mechanism whereby the anticariogenic agents operate is not fully understood, and it is not intended to limit the present invention to any particular theory of operability. However, it is believed that the presence of a significant proportion (i.e., an anticariogenic amount) of the anticariogenic agents in combination with the sugar acts to inhibit the production of caries-promoting acid by the tacky, sacchariferous material which sticks to the various crevices in the teeth and firmly adheres to the dental plaque. The anticariogenic agents are soluble in water and thus act systemically on the teeth by means of a salivary secretion of the active agent after ingestion. Therefore, even after the sugar residue adhering to the plaque is dissolved, the salivary glands in the mouth continue to release ingested anticariogenic agent. While there may be some topical contribution offered by the anticariogenic agent, this attribute would appear to be substantially dissipated in a period of about 15–30 minutes after ingestion, as is the case with other known anticariogenic agents which act locally. However, as distinguished from other anticariogenic agents such as fluoride-containing salts which are not secreted by the salivary glands, the anticariogenic agents of the present invention are absorbed by the system, recirculated, and then secreted through the salivary glands.

As previously noted, the cariogenic potential of comestibles and sugar-containing comestibles may be significantly reduced by incorporating therein at least 0.05% by weight of the anticariogenic agent. The anticariogenic effectiveness of the comestible product of the present invention has been verified by the dental caries experience of rats (standard experimental animals for anticariogenic studies). As is well known to one skilled in the art, the effectiveness of an agent in reducing the solubility of dental enamel in rats is a reliable indicator of anticariogenicity. Enamel solubility characteristics of dental compositions in rats may be determined by a number of tests well known in the art. The particular test for reduction in tooth enamel solubility described hereinafter involves a comparison of the acid solubility of the teeth of a group of rats fed a standard test diet incorporating the agent to be evaluated relative to the enamel solubility of the teeth of a control group of similar rats fed only the standard diet. The said comparison is expressed as "ESR," that is, enamel solubility reduction relative to the control group.

The enamel solubility of rat teeth is determined as follows. The test animals are sacrificed and the mandibular molars are removed. Soft tissue is removed from the molars and each is then embedded in methyl methacrylate. The clinical crowns are decalcified in 0.2 N (pH 4) sodium acetate buffer, and the decalcification solutions are analyzed for phosphorus by the Fisk and Subbarow colorimetric method [Jouranl of Biological Chemistry, 66, 375 (1925)]. Phosphorus liberation of the teeth from the animals fed the test diet incorporating the agent to be tested is compared with that of teeth from rats fed only the standard control diet, and the result of such comparison is reported as a percentage reduction of enamel solubility (i.e., ESR). The described method is discussed in greater detail in Buttner, W., and Muhler, J. C., "A Method for the Determination of the Enamel Solubility of Intact Rat Molars Using Highly Concentrated Fluoride Solutions," Journal of Dental Research, 36, 897( 1957).

Compounds 64, 65, and 66 have been shown to be effective anticariogenic agents when provided in combination with a sugar-containing comestible, as illustrated in the following examples.

EXAMPLE IV

A suitable number of female albino rats were divided into 9 equal groups. A stock cariogenic diet comprising 45.6% corn meal, 28.4% powdered whole milk, 20% sucrose, 4.8% alfalfa meal, 1.0% iodized salt, and 0.2% irradiated yeast was prepared and various experimental phosphates (i.e., $NaH_2PO_4$, urea polyphosphate, and Compounds 64, 65, and 66) were added to the diet at a level of 1.0%, at the expense of an identical amount of corn meal. The animals were maintained on distilled water and the respective diets ad libitum for 1 week, at which time they were sacrificed. One group of rats was fed the stock cariogenic diet without any agent, and hence served as a control group. After the various groups had been provided with their respective diet ad libitum for 1 week, the animals were sacrificed and the enamel solubility reductions determined in the previously described manner. Table IV gives the mean percent reduction in enamel solubility for the various groups of rats relatve to the control group. The data of Table IV verify the systemic anticariogenic effectiveness of Compounds 64, 65, and 66.

TABLE IV

Systemic effectiveness of different phosphates upon enamel solubility in the rat

| Dietary phosphate: | Mean percent reduction |
|---|---|
| None (control) | ---- |
| $NaH_2PO_4$ | 27.58 |
| Urea polyphosphate | 32.67 |
| Compound 64 | 35.37 |
| Compound 65 | 62.70 |
| Compound 66 | 66.79 |

EXAMPLE V

The effect of Compound 66 and $NaH_2PO_4$ upon the enamel solubility of the rat when administered in the presence of various sugars has also been determined. A suitable number of albino rats were divided into 13 equal groups and each group was provided with the previously described corn-sucrose stock diet ad libitum. Various phosphates were added at a level of 0.25% by weight to the drinking waters provided ad libitum to the various test groups, sugar being present at a level of about 10% by weight. The animals were maintained on these regimens for 5 days at which time they were sacrificed and the ESR data determined in the previously described manner. The results of these determinations are summarized in Table V. The data of Table V verify that Compound 66 was in each instance substantially more effective than $NaH_2PO_4$ in reducing the solubility of dental enamel. Furthermore, the effectiveness of Compound 66 was not limited to or dependent upon the particular sugar involved, high ESR values being obtained with each specific sugar measured, whereas in the case of $NaH_2PO_4$, the degree of effectiveness varied substantially with the particular sugar involved.

TABLE V

The Effect of Compound 66 and $NaH_2PO_4$ upon Enamel Solubility in the Rat When Administered in the Presence of Various Sugars

| Sugar (each at 10%) | Phosphate (each at 0.25%) | Mean percent reduction |
|---|---|---|
| Sucrose | None | |
| Do | Compound 66 | 53.48 |
| Do | $NaH_2PO_4$ | 18.93 |
| Dextrose | Compound 66 | 41.23 |
| Do | $NaH_2PO_4$ | 1.32 |
| Fructose | Compound 66 | 38.61 |
| Do | $NaH_2PO_4$ | 14.38 |
| Lactose | Compound 66 | 52.03 |
| Do | $NaH_2PO_4$ | 24.62 |
| Potato starch | Compound 66 | 53.11 |
| Do | $NaH_2PO_4$ | 12.53 |
| Corn starch | Compound 66 | 53.20 |
| Do | $NaH_2PO_4$ | 32.84 |

EXAMPLE VI

In order to determine the effect of different concentrations of Compounds 65 and 66 upon the incidence of dental caries in the rat when ingested either in the diet or with sucrose as a constituent of drinking water, a suitable number of weanling male rats were divided into 14 equal groups and provided with a stock cariogenic diet ad libitum. The animals in Group A received the cariogenic diet and distilled water and thus served as a control group. The anmals in Groups B, C, and D received the stock diet to which 0.05, 0.10, and 0.25 percent, respectively, of Compound 65 had been added at the expense of corn grits, while the animals in Groups E, F, and G were provided with diets containing identical levels of Compound 66, respectvely. The animals in Groups I, J, and K received the stock cariogenic diet and drinking water containing 10% sucrose and 0.05, 0.10, and 0.25 percent Compound 65, respectively, while the animals in Groups L, M, and N received the cariogenic diet and 10% sucrose drinking waters containing identical levels of Compound 66. The groups of anmals were maintained on their respective regimens for 8 weeks at which time the animals were sacrificed and their heads removed, coated, and examined for the incidence of dental caries. The results of this study are summarized in Table VI.

The data of Table VI verify that, at levels as low as 0.05%, by weight, Compounds 65 and 66 of the present invention are anticariogenically effective in a sucrose environment. Moreover, the results summarized in Table VI also verify that these anticariogenic agents are effective when provided either in a sugar-containing cariogenic diet or in a source containing solution.

EXAMPLE VII

Radioactive tracer studies have been conducted in order to compare the metabolism of radioactive phosphorus ($P^{32}$) as supplied by various phosphates. A suitable number of male rats were divided into 7 equal groups according to body weight and were provided the previously described stock corn-sucrose diet and distilled water ad libitum. The animals in Groups 1, 2, and 3 were given 5, 25, and 50 milligrams of $P^{32}$-labeled Compound 66, respectively, in aqueous solution by oral intubation, while the animals in Groups 4, 5, and 6 received comparable levels of $P^{32}$-labeled $NaH_2PO_4$ in an identical manner. The animals in Group 7 did not receive any radio isotope and served as controls. Four hours after intubation of the radioactive phosphates, saliva and blood samples were collected from 6 animals in each group. The animals were then sacrificed and the mandibular molars and femurs removed. The various samples were analyzed for $P^{32}$ content. The remaining animals in each group were similarly sacrificed and analyzed 24 hours following the intubation of the radioactive phosphates.

A summary of the results of this example is given in Table VII, which reports the counts per minute (c.p.m.) per milliliter of saliva and blood and the counts per minute (c.p.m.) per milligram of femur and hemijaw with respect to molars. The data reported in Table VII verify that, in almost every instance, a significantly greater amount of phosphate was absorbed and re-circulated in the case of Compound 66, relative to $NaH_2PO_4$, although, of course, $NaH_2PO_4$ and Compound 66 both exhibited substantially higher phosphate absorption levels than did the control. Thus, it would appear that Compound 66 is metabolized at a substantially higher and longer lasting level than is $NaH_2PO_4$.

TABLE VI

The Effect of Compounds 65 and 66 Upon Experimental Dental Caries in the Rat When Provided Either in the Diet or in the Drinking Water

| Group | Experimental regimen | | Mean wt. gain (g.) | Mean No. lesions | Mean percent reduction |
|---|---|---|---|---|---|
| | Diet | Water | | | |
| A | Cariogenic (control) | Distilled | 165.3 | 8.08 | |
| B | 0.05% Compound 65 | do | 158.2 | 6.36 | 21.28 |
| C | 0.10% Compound 65 | do | 149.5 | 5.38 | 33.41 |
| D | 0.25% Compound 65 | do | 151.0 | 6.27 | 22.40 |
| E | 0.05% Compound 66 | do | 163.1 | 5.96 | 26.23 |
| F | 0.10% Compound 66 | do | 158.6 | 5.32 | 34.15 |
| G | 0.25% Compound 66 | do | 174.8 | 4.69 | 41.95 |
| H | Cariogenic (control) | 10% sucrose | 142.2 | 11.54 | |
| I | Cariogenic | 0.05% Compound 65 | 139.8 | 8.17 | 29.20 |
| J | do | 0.10% Compound 65 | 134.4 | 6.26 | 45.75 |
| K | do | 0.25% Compound 65 | 139.2 | 4.43 | 61.61 |
| L | do | 0.05% Compound 66 | 145.8 | 8.06 | 30.15 |
| M | do | 0.10% Compound 66 | 138.2 | 8.41 | 27.12 |
| N | do | 0.25% Compound 66 | 149.3 | 6.71 | 41.85 |

TABLE VII

Radiotracer studies of the metabolism of $P^{32}$-labeled Compound 66 and $NaH_2PO_4$

| Group | Treatment | 4 hour data | | | | 24 hour data | | | |
|---|---|---|---|---|---|---|---|---|---|
| | | Saliva (c.p.m./ml.) | Blood (c.p.m./ml.) | Femurs (c.p.m./mg.) | Molars (c.p.m./hemijaw) | Saliva (c.p.m./ml.) | Blood (c.p.m./ml.) | Femurs (c.p.m./mg.) | Molars (c.p.m. hemijaw) |
| 1 | 5 mg. Compound 66 | 583.1 | 12,176 | 839.3 | 41.55 | 287.4 | 6,394 | 794.2 | 48.82 |
| 2 | 25 mg. Compound 66 | 608.9 | 9,698 | 680.2 | 47.69 | 252.5 | 6,352 | 741.1 | 44.35 |
| 3 | 50 mg. Compound 66 | 598.0 | 8,086 | 524.9 | 45.37 | 303.7 | 5,802 | 633.3 | 46.53 |
| 4 | 5 mg. $NaH_2PO_4$ | 589.5 | 9,759 | 689.2 | 33.37 | 235.7 | 6,167 | 751.0 | 32.68 |
| 5 | 25 mg. $NaH_2PO_4$ | 504.3 | 9,634 | 669.2 | 41.71 | 185.1 | 5,032 | 586.1 | 28.03 |
| 6 | 50 mg. $NaH_2PO_4$ | 548.2 | 8,561 | 545.5 | 38.38 | 187.2 | 4,835 | 538.8 | 29.88 |
| 7 | Control | 23.3 | 20.3 | 24.1 | 6.17 | 23.1 | 19.7 | 21.8 | 6.01 |

Furthermore, in situ plaque pH studies in humans of the effect of aqueous mouth rinses containing various phosphates have revealed that the anticariogenic agents of the present invention are significantly effective in increasing the resistance of the dental plaque to a drop in pH following challenge with a substance such as sugar, especially in comparison with prior art phosphate agents such as $NaH_2PO_4$. As is well known to those skilled in the art, a decrease in pH of the dental plaque typically results in an increase of dental caries. Thus, the effect of the anticariogenic agents on plaque pH further serves to indicate the anticariogenic effectiveness of the new compositions of matter of the present invention.

Animal toxicity

In addition to exhibiting a high level of anticariogenic effectiveness, Compounds 64, 65, and 6 may be safely utilized in animal organisms without any dangerous side effects. The low toxicity of the anticariogenic agents compares quite favorably with that of other phosphate-containing agents, as exemplified by $NaH_2PO_4$.

The toxicity of the anticariogenic agents has been determined in mice (standard experimental animals for this purpose) and acute toxcity data are shown in Table VIII, with corresponding values for $NaH_2PO_4$ included for comparative purposes. The toxicity is expressed in terms of an $LD_{50}$, which is the lethal dose for 50% of the animals tested. The $LD_{50}$ is expressed both in grams of compound per kilogram of body weight and in grams of phosphorus per kiligram of body weight. The acute $LD_{50}$ data were determined by feeding a suitable number of test mice various levels of the phosphate by oral intubation. Mortalities were determined 24 hours later, and $LD_{50}$ data are reported in Table VIII.

TABLE VIII.—ACUTE TOXICITY

| Compound | $LD_{50}$ Grams, cpd/kg. | Grams, P/kg. |
| --- | --- | --- |
| $NaH_2PO_4$ | 9.69 | 2.501 |
| Compound 65 | 5.60 | 1.34 |
| Compound 66 | 8.10 | 1.24 |

The data of Table VIII verify that the compounds of the present invention, as well as the prior art $NaH_2PO_4$, may be safely employed at the levels necessary to achieve anticariogenic effectiveness. Moreover, chronic toxicity studies verified that anticariogenic agents of the present invention produce no significant adverse results from a chronic toxicity standpoint.

Exemplary comestibles

The constituents of exemplary comestibles produced in accordance with the present invention are given in the following examples. The preparations and recipes for these comestibles are conventional and well known to the art and, thus, are not described in detail herein.

EXAMPLE VIII

Cocoanut cake

| | Percent |
| --- | --- |
| Flour | 27.7 |
| Butter | 8.2 |
| Sucrose (containing 1% Compound 66 or 1% Compound 65) | 32.9 |
| Milk | 16.4 |
| Baking powder | 0.3 |
| Eggs | 12.3 |
| Cocoanut | 2.2 |
| | 100.0 |

EXAMPLE IX

Sponge cake

| | Percent |
| --- | --- |
| Eggs | 34.9 |
| Sucrose (containing 1% Compound 66 or 1% Compound 65) | 34.9 |
| Cornstarch | 2.2 |
| Baking Powder | 0.9 |
| Flour | 26.2 |
| Vanilla | 0.6 |
| Salt | 0.3 |
| | 100.0 |

EXAMPLE X

Chocolate fudge

| | Percent |
| --- | --- |
| Cocoa | 6.5 |
| Sucrose (containing 1% Compound 66 or 1% Compound 65) | 58.3 |
| Salt | 0.1 |
| Milk | 29.1 |
| Butter | 5.6 |
| Vanilla | 0.4 |
| | 100.0 |

EXAMPLE XI

Date pudding

| | Percent |
| --- | --- |
| Flour | 19.4 |
| Baking powder | 0.5 |
| Sucrose (containing 1% Compound 66 or 1% Compound 65) | 5.7 |
| Butter | 5.7 |
| Eggs | 5.7 |
| Milk | 17.2 |
| Dates | 22.9 |
| Nuts | 22.9 |
| | 100.0 |

EXAMPLE XII

Cornstarch pudding

| | Percent |
| --- | --- |
| Milk | 89.5 |
| Cornstarch | 5.0 |
| Sucrose (containing 1.5% Compound 66 or 1.5% Compound 65) | 5.0 |
| Salt | 0.1 |
| Vanilla | 0.4 |
| | 100.0 |

EXAMPLE XIII

Lemonade

| | Percent |
| --- | --- |
| Sucrose (containing 1.5% Compound 66 or 0.75% Compound 65) | 12.5 |
| Lemon juice | 1.0 |
| Water | 86.5 |
| | 100.0 |

EXAMPLE XIV

Chewing gum

| | Percent |
| --- | --- |
| Gum base (e.g., chicle) | 20.5 |
| Sucrose (containing 1% Compound 66 or 1% Compound 65) | 60.0 |
| Corn syrup | 18.5 |
| Flavoring agents | 1.0 |
| | 100.0 |

EXAMPLE XV

Chewing gum

| | Percent |
|---|---|
| Gum base | 22.0 |
| Corn syrup | 22.0 |
| Mannose (containing 1% Compound 66 or 1% Compound 65) | 54.9 |
| Flavoring agents | 1.0 |
| Saccharine, sodium | 0.1 |
| | 100.0 |

EXAMPLE XVI

Nougat-type candy

| | Percent |
|---|---|
| Soy bean protein (e.g., "Promine" D) | 8.0 |
| Sucrose (containing 1% Compound 66 or 1% Compound 65) | 40.2 |
| Water | 37.6 |
| Corn syrup solids | 13.4 |
| Carboxymethyl cellulose | 0.5 |
| Calcium carbonate | 0.3 |
| | 100.0 |

EXAMPLE XVII

Instant pudding mix

| | Percent |
|---|---|
| Sucrose (containing 1% Compound 66 or 1% Compound 65) | 74.5 |
| Flavored corn sugar | 1.9 |
| Colored corn sugar | 2.4 |
| Salt | 1.1 |
| Pre-cooked starch | 15.6 |
| $Na_4P_2O_7$ (anhydrous) | 1.7 |
| $Na_2HPO_4$ (anhydrous) | 2.2 |
| Calcium acetate | 0.6 |
| | 100.0 |

EXAMPLE XVIII

Beverage powder

| | Percent |
|---|---|
| Imitation flavor (powder) | 0.7 |
| Citric acid | 12.5 |
| Dextrose (containing 1% Compound 66 or 0.75% Compound 65) | 85.8 |
| Artificial coloring agents | 1.0 |
| | 100.0 |

EXAMPLE XIX

Chocolate beverage mix

| | Percent |
|---|---|
| Cocoa | 16.0 |
| Sucrose (containing 1% Compound 66 or 1% Compound 65) | 84.0–83.2 |
| Emulsifier | 0–0.8 |
| | 100.0 |

EXAMPLE XX

Cocoa-sugar dry mix drink

| | Percent |
|---|---|
| Cocoa | 18.0 |
| Sucrose (containing 1% Compound 66 or 1% Compound 65) | 61.95–61.90 |
| Non-fat dried milk solids | 20.0 |
| Flavor | 0.05–0.10 |
| | 100.0 |

EXAMPLE XXI

Gelatin dessert mix

| | Percent |
|---|---|
| Sucrose (containing 1% Compound 66 or 1% Compound 65) | 85.0 |
| Gelatin | 10.0 |
| Trisodium citrate (buffer) | 0.8 |
| Flavor | 1.0 |
| Color | 0.2 |
| Fumaric-adipic acids (ratio 1:3) | 3.0 |
| | 100.0 |

EXAMPLE XXII

Gelatin dessert mix

| | Percent |
|---|---|
| Sucrose (containing 1% Compound 66 or 1% Compound 65) | 86.0 |
| Gelatin | 9.4 |
| Trisodium citrate (buffer) | 1.0 |
| Flavor | 0.4 |
| Color | 0.4 |
| Adipic acid | 2.8 |
| | 100.0 |

Other beverages (e.g., artificial orange drink) contain the same general distribution of sugar and water and differ only in the flavoring agent, coloring agent, etc.

Each of the comestibles referred to in Examples VIII–XXII are shown to include anticariogenic sugar containing a specified level of Compound 64, 65, and/or 66 expressed as a percentage of the total comestible. It should be understood that these teachings are merely exemplary of the practice of the present invention, since the particular recipes are of course subject to wide variations based upon taste considerations, costs, etc. Moreover, it should be further understood that the anticariogenic agents can be added either as a component of the sugar (i.e., a "treated" sugar basis) or equivalently as a component of the comestible itself, either before or after the sugar or simultnaeously therewith (i.e., a "comestible blend" basis).

The addition of Compounds 64, 65, and/or 66 to sugar, comestibles, and sugar-containing comestibles provides a new and unique method for reducing the cariogenic potential thereof. In addition, the ingestion of anticariogenic agent-treated sugar, comestibles, or sugar-containing comestibles containing anticariogenic agents also provide a new and unique method for reducing the incidence of dental caries.

Moreover, the new anticariogenic agents of the present invention may be employed at substantially lower levels than the previously utilized compounds such as $NaH_2PO_4$; they exhibit effectiveness whether in the form of a solid comestible or whenever they are added to a sucrose-containing solution; the compounds contain no alkali metals such as sodium, potassium or calcium, and, therefore, present no appreciable problem from an organoleptic standpoint; the compounds, although acidic in dilute aqueous solution form, have no appreciable buffering capacity and, thus, do not appreciably alter the pH of sugar for a comestible to which it is added; and these compounds are significantly more effective with respect to anticariogenicity than the prior phosphate agents such as $NaH_2PO_4$.

The anticariogenic compositions of the present invention have been found to be significantly anticariogenically effective when administered in the presence of non-nutritive artificial sweetening agents (e.g., saccharine, sodium and calcium salts of saccharine, sodium and calcium cyclamates, and the like), as well as in the presence of sugars such as sucrose. The effectiveness of the anticariogenic agents of the present invention in the presence of artificial sweeteners (i.e., in the absence of sugars) is demonstrated by the following example.

EXAMPLE XXIII

A suitable number of test rats were divided into 10 equal groups. Each group was given the previously described stock cariogenic diet. In addition, the animals were maintained on a driking water regimen comprising the anticariogenic agent to be evaluated (i.e., NaH$_2$PO$_4$ and Compounds 65 and 66) at a 1% level (by weight of the drinking water) together with an appropriate amount of the sweetening agent (0.14% in the case of sodium saccharine and "Sucaryl"[1] and 10% in the case of sucrose for comparison purposes). In addition, one group received distilled water as a drinking regimen and served as a control group. Thereafter, the animals were sacrificed, and enamel solubility values were determined in the foregoing manner. Percentage reduction figures are given in Table IX.

TABLE IX

The effect of Various Anticariogenic Agents in the Presence of Sucrose and Artificial Sweeteners Upon Enamel Solubility in the Rat

| Group | Drinking water | | pH, natural | No. of hemijaws | Mean percent reduction |
|---|---|---|---|---|---|
| | Anticariogenic agent | Sweetener | | | |
| 1 | Control | Control | 5.4 | 10 | |
| 2 | 1.0% NaH$_2$PO$_4$ | 10% sucrose | 4.7 | 10 | 14.47 |
| 3 | 1.0% Compound 65 | do | 2.0 | 10 | 50.87 |
| 4 | 1.0% Compound 66 | do | 2.1 | 10 | 51.30 |
| 5 | 1.0% NaH$_2$PO$_4$ | 0.14% sodium saccharine | 4.2 | 10 | 24.48 |
| 6 | 1.0% Compound 65 | do | 2.1 | 10 | 52.33 |
| 7 | 1.0% Compound 66 | do | 2.3 | 0 | 48.12 |
| 8 | 1.0% NaH$_2$PO$_4$ | 0.14% Sucaryl | 5.0 | 10 | 16.55 |
| 9 | 1.0% Compound 65 | do | 2.2 | 10 | 39.04 |
| 10 | 1.0% Compound 66 | do | 2.2 | 10 | 53.94 |

The data of Table IX verify the effectiveness of Compounds 65 and 66 in the presence of artificial sweeteners as well as in the presence of nutritive sweeteners such as sucrose (i.e., sugars).

While the compositions and methods of the present invention have been described with reference to certain preferred embodiments, it should be understood that various changes, modification, and alterations may be effected in the materials utilized, in the proportions of materials, and in the manners of formulation, without departing from the spirit and the scope and the present invention, as defined in the appended claims.

[1] "Sucaryl" is a registered trademark of Abbott Laboratories for a non-nutritive artificial sweetening agent comprising sodium cyclamate and sodium saccharine.

I claim:

1. An anticariogenic composition comprising a comestible and at least about 0.05% by weight of the composition of a member selected from the group of products obtained by a process comprising the step of reacting phosphorus pentoxide, P$_4$O$_{10}$, with a molar excess of urea in an aqueous environment at a temperature in the range of about 50–60° C. at least until a precipitate forms, the molar ratio of urea to phosphorus pentoxide being 2$^n$:1, where $n$ is an integer from 1 to 3 inclusive.

2. A composition, as claimed in claim 1, wherein the cosmetible comprises sugar.

3. A method for reducing the incidence of dental caries comprising ingesting a comestible incorporating at least about 0.05% by weight of the comestible of a member selected from the group consisting of products obtained by a process comprising the step of reacting phosphorus pentoxide, P$_4$O$_{10}$, with a molar excess of urea in an aqueous environment at a temperature in the range of about 50–60° C. at least until a precipitate forms, the molar ratio of urea to phosphorus pentoxide being 2$^n$:1, where $n$ is an integer from 1 to 3.

4. A method, as claimed in claim 3, wherein the comestible comprises sugar.

5. An anticariogenic composition comprising a comestible and at least about 0.05% by weight of the composition of a member selected from the group consisting of:

urea pyrophosphate, a compound having the structure

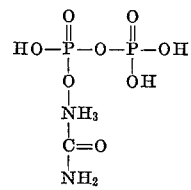

dimerized urea carbamido' pyrophosphate, a compound having the structure

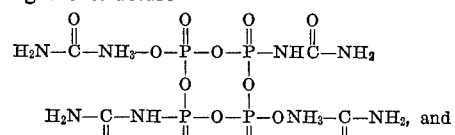

tetraurea pyrophosphate, a compound having the structure

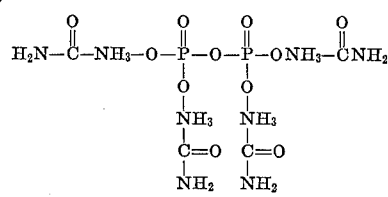

6. A composition, as claimed in claim 5, wherein the comestible comprises sugar.

7. A method for reducing the incidence of dental caries comprising ingesting a comestible incorporating at least about 0.05% by weight of the comestible of a member selected from the group consisting of:

urea pyrophosphate, a compound having the structure

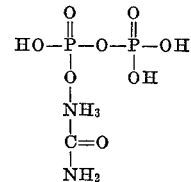

dimerized urea carbamido' pyrophosphate, a compound having the structure

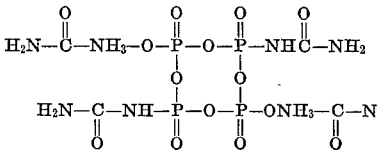

tetraurea pyrophosphate, a compound having the structure
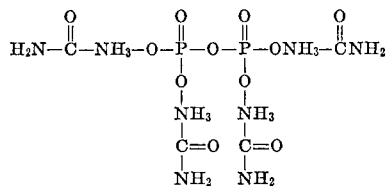
8. A method, as claimed in claim 7, wherein the comestible comprises sugar.
References Cited
Nizel et al., Journal of Dental Research, Supplement to vol. 43, No. 6, pages 1123–1136, November-December, 1964.
RICHARD L. HUFF, Primary Examiner
U.S. Cl. X.R.
424—54, 204